United States Patent
Eaton et al.

(10) Patent No.: US 7,825,641 B2
(45) Date of Patent: Nov. 2, 2010

(54) METHOD AND APPARATUS FOR REGULATING EXCITATION OF AN ALTERNATOR

(75) Inventors: Zane C. Eaton, Plymouth, WI (US); Doug Dorn, Sheboygan Falls, WI (US); Eric Albsmeier, Sheboygan, WI (US); Harrison Chiu, Brookfield, WI (US); Isaac Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 477 days.

(21) Appl. No.: 12/041,006

(22) Filed: Mar. 3, 2008

(65) Prior Publication Data

US 2009/0218991 A1    Sep. 3, 2009

(51) Int. Cl.
F02B 63/04 (2006.01)
B60L 11/02 (2006.01)

(52) U.S. Cl. .................. 322/29; 322/37; 290/1 A

(58) Field of Classification Search .......... 322/22, 322/23, 25, 28, 37, 99; 290/1 A, 40 C
See application file for complete search history.

(56) References Cited

U.S. PATENT DOCUMENTS

| | | | |
|---|---|---|---|
| 4,307,450 A | 12/1981 | Carp et al. | |
| 4,777,425 A | 10/1988 | MacFarlane | |
| 5,006,781 A | 4/1991 | Schultz et al. | |
| 5,013,995 A * | 5/1991 | Rashid | 322/25 |
| 5,038,094 A | 8/1991 | Rashid | |
| 5,170,065 A | 12/1992 | Shimizu et al. | |
| 5,325,043 A * | 6/1994 | Parro | 322/23 |
| 5,689,175 A * | 11/1997 | Hanson et al. | 322/28 |
| 6,351,692 B1 * | 2/2002 | Eaton et al. | 700/287 |
| 6,555,929 B1 * | 4/2003 | Eaton et al. | 290/40 B |
| 6,700,356 B1 | 3/2004 | Dorn | |
| 6,701,221 B1 * | 3/2004 | Eaton et al. | 700/286 |
| 6,853,169 B2 | 2/2005 | Burstein et al. | |
| 6,992,469 B1 | 1/2006 | King | |
| 7,023,672 B2 | 4/2006 | Goodfellow et al. | |
| 7,084,612 B2 | 8/2006 | Zinn | |
| 7,582,978 B2 * | 9/2009 | Flanigan et al. | 290/1 A |
| 2007/0096704 A1 | 5/2007 | Jain et al. | |
| 2007/0103136 A1 | 5/2007 | Jain | |

* cited by examiner

*Primary Examiner*—Nicholas Ponomarenko
(74) *Attorney, Agent, or Firm*—Quarles & Brady LLP; George E. Haas

(57) ABSTRACT

A hybrid voltage regulator controls the voltage of three phases of alternating electricity produced by an alternator. A digital voltage regulator produces an average of the RMS voltage for each phase and produces an error value based on a ratio of the voltage to the frequency of the alternating electricity. The RMS voltage average and the error value are used to modify a voltage command designating a desired voltage level. The modified voltage command is processed by an analog voltage regulator that rectifies the alternator output voltage which then is averaged over an period of time. The resultant average voltage value is utilized to modify the voltage command to produce a regulated voltage command that determines a level of current to apply to excite the alternator.

20 Claims, 2 Drawing Sheets

METHOD AND APPARATUS FOR REGULATING EXCITATION OF AN ALTERNATOR

CROSS-REFERENCE TO RELATED APPLICATIONS

Not Applicable

STATEMENT REGSRDING FEDERALLY SPONSORED RESEARCH OR DEVELOPMENT

Not Applicable

BACKGROUND OF THE INVENTION

1. Field of the Invention

The present invention relates to the control of an electric generator set that includes an engine that mechanically drives an alternator, and in particular to regulating the voltage produced by the alternator.

2. Description of the Related Art

Electric generator sets (or "gensets") are widely used to produce electric power. A genset typically includes an engine coupled to an alternator, which converts the rotational energy from the engine into electricity. The output terminal voltage of a genset is proportional to both the magnetic flux density within the alternator and the speed of the engine. The magnetic flux density is typically determined by controlling the field current, or excitation level, of the alternator, while the speed of the engine is typically determined by an engine governor.

Many conventional alternators are three-phase machines that output three different alternating voltages, each having a phase angle that is offset 120 degrees with respect to the phase angle of the other two voltages. It is typically desirable for a genset to produce an output voltage at a known, relatively constant level, since many loads are designed to receive power at a given voltage. In particular, the genset often is coupled to a power grid that is designed to maintain particular voltage levels. Because the output voltage of the alternator of a genset is determined in part by the excitation level of the alternator, it is important to be able to control this excitation level.

Control of the excitation level typically requires feedback information concerning the output voltage of the alternator. In one type of control, the output voltage for one electrical phase is fed to an analog voltage regulator that senses the output voltage and compares the sensed voltage to the desired voltage level. That comparison produces an error signal which is employed to adjust the excitation level of the alternator to bring the output voltage to the desired level. Such analog voltage regulators respond very quickly to voltage fluctuations resulting from transient load changes, however regulation based on an average voltage level can lead to inaccurate output voltages under other load conditions.

Digital voltage regulators, that use microcomputers, have been developed which utilize RMS voltage measurements, thereby avoiding the inaccuracies that occur with analog regulators. The digital voltage regulators provided good compensation for voltage variation that occurs under steady state electrical load conditions. However, reasonably priced digital voltage regulators react slower than analog regulators and may not respond adequately to voltage fluctuations from transient load conditions and their software is required to be customized for different alternator design.

SUMMARY OF THE INVENTION

A hybrid voltage regulator controls voltage of alternating electricity that is produced by an alternator, wherein the alternator has a mechanism, such as an exciter, which controls the strength of a magnetic field in the alternator. The hybrid voltage regulator comprises both a digital voltage regulator, that provides steady-state RMS output voltage stability, and an analog voltage regulator, that provides fast response to transient conditions.

The digital voltage regulator responds to a voltage command designating a desired voltage level and to a first measurement of the RMS voltage of the alternating electricity by producing an adjusted voltage command. An analog voltage regulator responds to the adjusted voltage command and to a second measurement of the voltage of the alternating electricity by producing a regulated voltage command. A field control circuit employs the regulated voltage command to produce an electric current for driving the mechanism that controls the strength of a magnetic field in the alternator.

In a preferred embodiment, the digital voltage regulator includes a first detector that produces the first measurement which corresponds to an average of the RMS voltage for each phase of the alternating electricity produced by the alternator. A second detector employs an RMS voltage measurement of the alternating electricity to derive a voltage to frequency ratio (V/Hz). That ratio is used to produce an error value. A first circuit modifies the voltage command in response to the first measurement, thereby producing a digital adjusted voltage command. A converter transforms the digital adjusted voltage command into an analog adjusted voltage command.

The preferred version of the analog voltage regulator includes a voltage sensor that produces the second measurement by rectifying the voltage of the alternating electricity to produce a rectified voltage that then is averaged over an period of time. A second circuit modifies the adjusted voltage command in response to the second measurement, thereby producing the regulated voltage command.

DETAILED DESCRIPTION OF THE INVENTION

Figure 1:
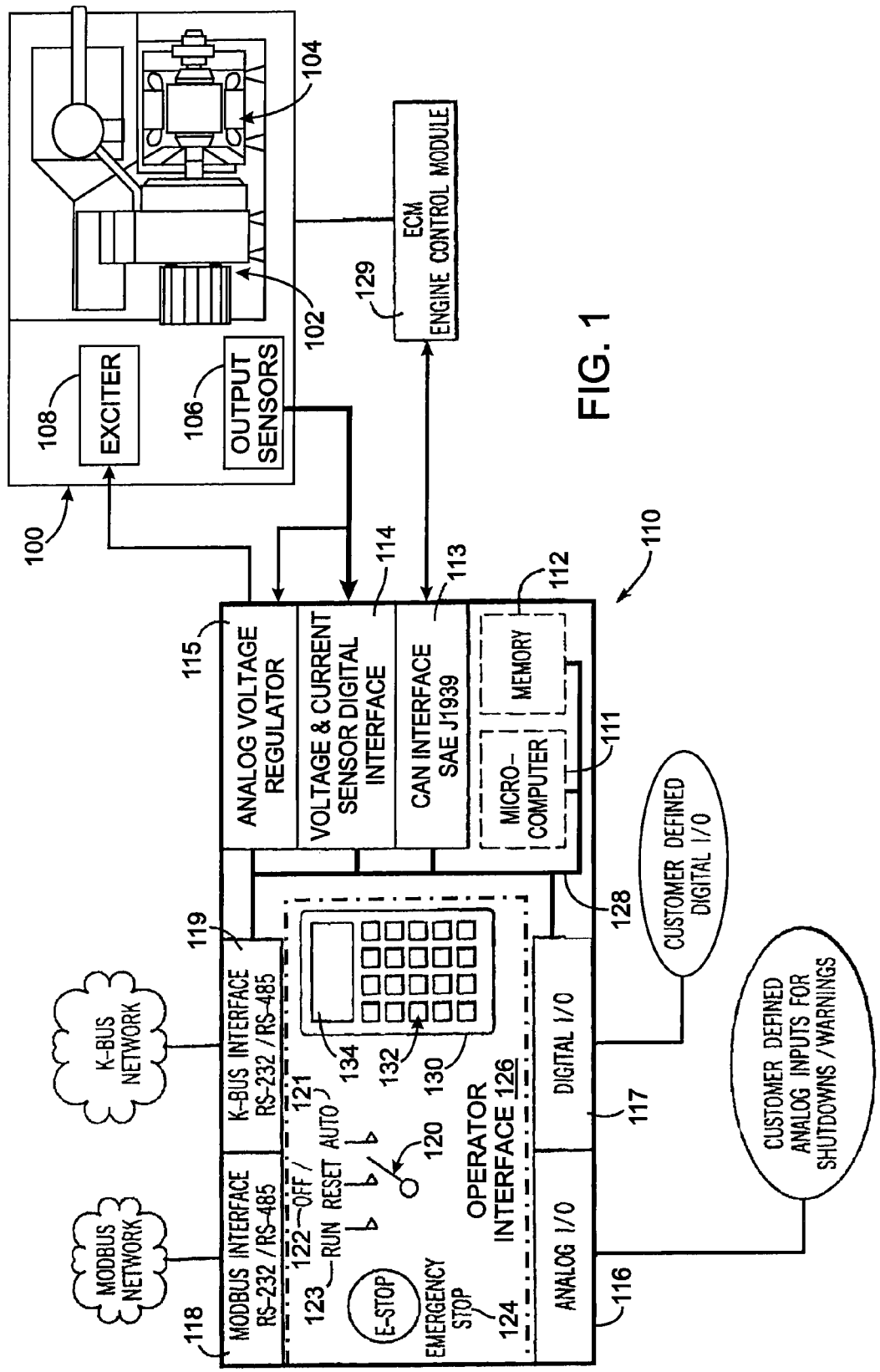
FIG. 1 is a block diagram showing a genset including an alternator, an engine control module, and a genset controller that is capable of controlling the excitation of the alternator.

With initial reference to FIG. 1, a generator set (genset) 100 includes an engine 102 and an alternator (or synchronous generator) 104, and has a typical power rating of between 20 KW and 2000 KW, or more. Engine 102 is typically an internal combustion engine that is powered by gasoline, diesel fuel, methane gas or other fuels and provides torque to a rotor of alternator 104. The rotation of the rotor produces a rotating magnetic field, which induces alternating electricity in set of stator coils.

Figure 2:
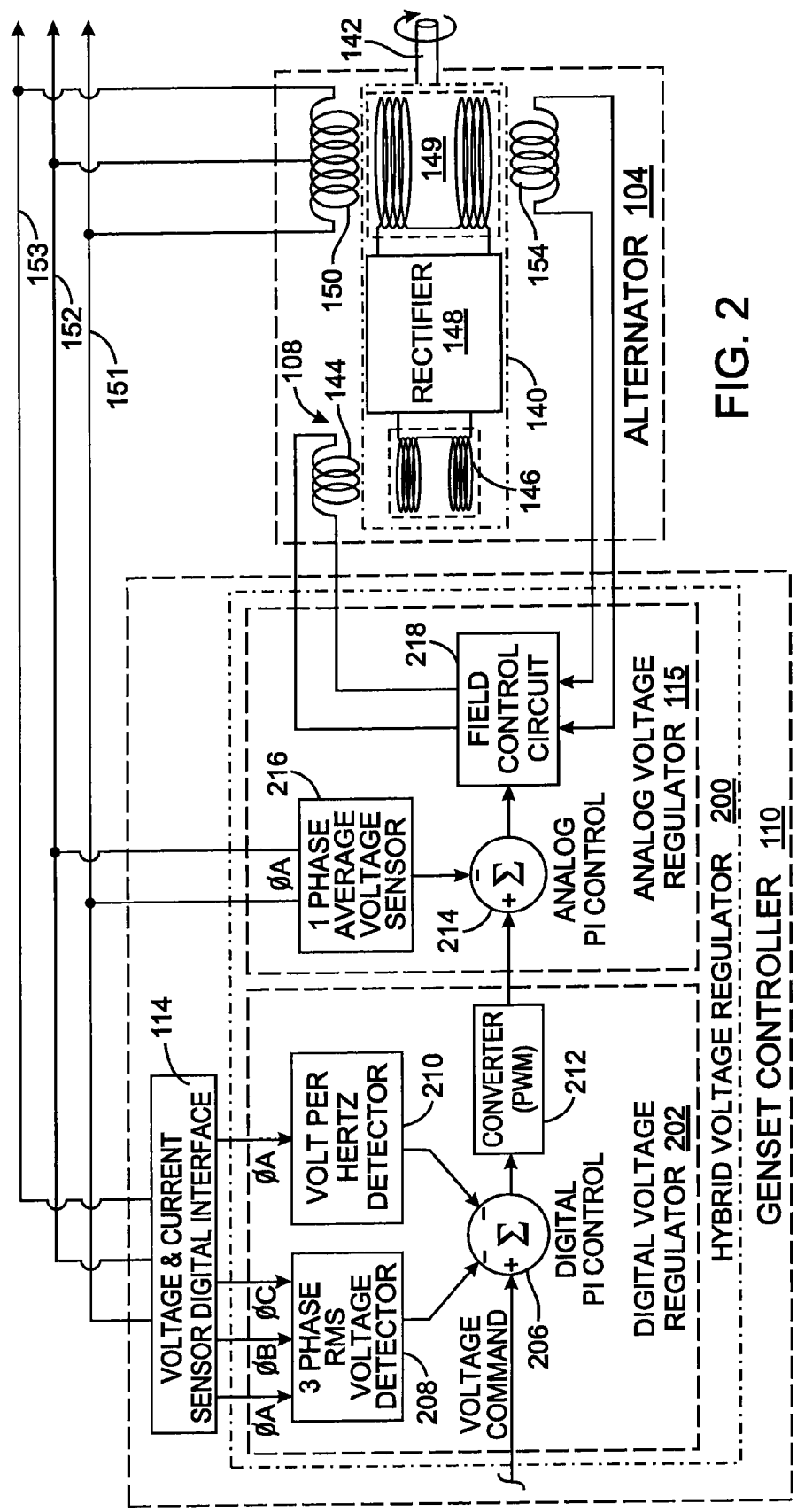
FIG. 2 is a functional diagram of a hybrid digital-analog voltage regulator in the genset controller.

As shown in FIG. 2, the alternator 104 is a three-phase synchronous machine whereby rotation of its rotor 140 produces a rotating magnetic field, which induces alternating voltages at set of stator coils 150. Specifically, the rotor 140 is driven by a shaft 142 that is connected to the engine 102. The strength of the magnetic field is controlled by a mechanism that includes an exciter 108 comprising a set of stationary coils 144 surrounding armature coils 146 wound on the rotor 140. The armature coils 146 are connected to a rectifier circuit 148 which produces a direct current that is applied to the field coils 149 on the rotor. The field coils 149 rotate within a set of stator coils 150 in which the output current for the alternator is produced. The stator coils 150 may be wound in conventional delta or wye configurations. The terminals of the stator coils 150 are connected to three output lines 151, 152, and 153. The alternator 104 also has a stationary pickup coil 154 that is wound adjacent the field coil 149.

The exemplary alternator 104 shown in FIG. 2 is a brushless type, however a hybrid voltage regulator according to the present invention can be used with other types of alternators. Such other alternators, for example, include those in which the field coils are driven directly via brush connections and alternators that have a permanent magnet rotor and an electrically controlled mechanism for adjusting the magnetic field.

Referring again to FIG. 1, a controller (genset controller) 110 is shown coupled to control and monitor the operation of the generator set 100. The genset controller 110 is a computerized system that includes a microcomputer 111 and a memory 112 that stores the software program and data for operating the genset. Several interfaces, that enable the genset control and monitoring, include a CAN interface 113, a voltage and current sensor digital interface 114, an analog voltage regulator 115, an analog input/output (analog I/O) interface 116 and a digital input/output (digital I/O) interface 117. These interfaces are coupled to the microcomputer 111 by a set of buses 128, which allows for signal sampling, signal multiplexing, and control of peripheral devices, such as operator interface devices, discussed below). The voltage and current sensor digital interface 114 receives signals from output sensors 106 in the genset 100 regarding the voltage and current for each electrical phase produced by the alternator 104. As will be described in greater detail, the analog voltage regulator 115 responds to those sensor signals by producing a current that is applied to an exciter 108 that drives the alternator fields coils to generate the rotating magnetic field.

The genset controller 110 is capable of communication with remote control and monitoring devices via both a K-BUS interface 119 and a MODBUS interface 118. K-BUS interface 119 provides serial communications using a proprietary K-Bus serial communications protocol. The MODBUS interface 118 provides serial communications using any of a variety of "open" serial communications protocols. Both the K-BUS interface 109 and the MODBUS interface 118 are configurable to use either the RS-232 or RS-485 serial standards.

The genset controller 110 includes an operator interface 126, by which a person can both provide commands to the genset controller and receive information. The operator interface 126 includes a control switch 120, an emergency stop button 124, and an operator interface panel 130. The control switch 120 can be rotatably set to one of three positions: an Automatic (Auto) position 121; an Off/Reset position 122; and a Run position 123. Setting the control switch to Run position 123 causes genset controller 110 to send a signal via an engine control module (ECM) 129 to start and run the genset 100. Setting control switch 120 to Auto position 121 allows the genset 100 to be started and controlled from a remote location. This mode of operation also allows for time-delayed engine starting and cool-down. Setting control switch 120 to Off/Reset position 122 initiates the immediate shutdown of genset 100 and also resets the software program of genset controller 110. If a fault occurs that precipitates a system shutdown, an operator must move control switch 120 to Off/Reset position 122 to clear the fault before the genset 100 can be restarted. The emergency stop button 124 allows an operator to immediately stop the genset 100 by pressing a pushbutton.

The operator interface panel 130 includes a keypad 132 having a plurality of pushbutton data entry keys and an LED or LCD display 134. The keypad 132 allows an operator to enter a variety of information and commands into genset controller 110. The display 134 is an alphanumeric display by which the genset controller 110 presents information concerning system operation to an operator. Other types of displays, such as a vacuum fluorescent display, also may be used.

With reference to FIG. 2, the genset controller 110 provides regulation of the three-phase voltages produced by the alternator 104. For that purpose, the genset controller 110 includes a hybrid voltage regulator 200 that comprises a digital voltage regulator 202 and the analog voltage regulator 115. The digital voltage regulator 202 and the analog voltage regulator are connected in series to convert a voltage command, that designates a desired voltage level, into a regulated voltage command, which defines the magnitude of excitation for the alternator 104. In the preferred embodiment of the hybrid voltage regulator 200 as illustrated in FIG. 2, the digital voltage regulator 202 receives the voltage command and produces and adjusted voltage command that then is processed by the analog voltage regulator 115 into the regulated voltage command. Nevertheless, the series connection and processing sequence of the digital voltage regulator 202 and the analog voltage regulator 115 could be reversed.

The digital voltage regulator 202 is implemented in software that is executed by the microcomputer 111, however a dedicated microcomputer alternatively can be provided for this functionality. The main genset control program sends the digital voltage regulator 202 a voltage command, or setpoint, that designates a desired output voltage for the alternator 104. That voltage command is applied to one input of a digital proportional-integral (PI) control circuit 206, which also receives signals from a three-phase RMS voltage detector 208 and a volt per Hertz detector 210. The gain of the proportional-integral (PI) control loop is adjustable by the microcomputer 111.

The three-phase RMS voltage detector 208 is connected via the voltage and current sensor digital interface 114 to the alternator output lines 151-153. The voltage and current sensor digital interface 114 contains analog to digital converter which produces digital values indicating the instantaneous voltage for each electrical phase $\phi A$, $\phi B$ and $\phi C$ produced by the alternator 104. The three-phase RMS voltage detector 208 uses the three digital voltage values to derive a digital RMS measurement of the voltage for each electrical phase. The average of the resultant three RMS measurements is calculated to produce an RMS value that is applied to another input of the digital PI control circuit 206. Thus, the digital voltage regulator 201 operates on an average of the RMS voltages for the three electrical phase $\phi A$, $\phi B$ and $\phi C$ from the alternator 104. In doing so, an aberration in one of the phase voltages will have a less significant effect on the voltage regulation, than if that one phase voltage was used alone for regulation thereby providing good steady state regulation. Alternatively, the three-phase RMS voltage detector 208 could accomplish the same result by averaging measurements of the instantaneous voltage of each phase and then deriving an RMS measurement from the averaged measurements for one cycle of the alternating current produced by the alternator.

The volt per Hertz (V/Hz) detector 210 is similar to conventional functions used to protect generators from damage caused by over excitation and compensate for the effects that change in the alternator load has on the engine speed. Specifically, the electrical load at the output of the alternator can have significant effects on the engine depending upon the load magnitude and the response time of the engine speed control. Diesel engines in particular have relatively slow response, or a long time-constant, in the regulation system in comparison of that of the electronic regulators of the alternator. A sudden increase in the load may result in a rapid decrease in the speed of the engine and the driven alternator. This effect often occurs when a large motor load is started. In the worst case, a sudden application of a large load can cause the engine to stall resulting in a complete loss of electrical power from the alternator.

In response to this adverse effect, conventional alternator control circuits, such as the one described in U.S. Pat. No. 4,777,425, have included relatively fast acting "volts per Hertz" ramp control to reduce the electrical load on the alternator and thus diminish the effect on engine speed. The V/Hz detector 210 receives the digital RMS voltage measurement for one electrical phase (e.g. phase φA) and computes the phase frequency from that voltage measurement. This enables the V/Hz detector 210 to derive a ratio of the voltage to frequency (volt per Hertz) for the selected phase, which ratio is used as an indicator when an overload condition exists. Various software approaches have been devised for deriving that ratio, any of which can be employed by the V/Hz detector 210. The software implementation of the V/Hz detector 210 allows a person configuring the regulator to select among several desired frequency response curves that are used in determining an error value denoting a difference between actual and desired alternator performance. Any resultant error value is applied to another input of the digital PI control circuit 206. Upon occurrence of an overload condition, the error value reduces the excitation of the alternator 104 which decreases the output voltage, thereby lessening the load on the engine 102.

The digital PI control circuit 206 also utilizes a conventional software implementation of a proportional-integral control loop which compensates for deviation of the actual output alternator voltage, as indicated by the output of the three-phase RMS voltage detector 208, from the desired voltage, as designated by the voltage command. The digital PI control circuit 206 produces adjusted voltage command that is applied to the control input of converter 212, such as pulse width modulator (PWM) or a digital to analog converter, which produces an analog output signal denoting the adjusted, desired voltage setpoint.

The digital voltage regulator 202 provides a relatively slow control loop to remove RMS voltage errors that are not commonly detected by a faster analog control loop that uses voltage averaging. In addition, this digital implementation provides the volts per Hertz compensation.

With continuing references to FIG. 2, the analog adjusted voltage command from the converter 212 is applied to the input of the analog voltage regulator 115. Specifically, a conventional analog proportional-integral control circuit 214 has one input that receives the analog, adjusted voltage command and another input receives the output of a single phase, average voltage sensor 216. That voltage sensor 216 is an analog circuit that rectifies the voltage for one electrical phase, e.g. φA, of the alternator output. The instantaneous rectified voltage is averaged over a given period of time (e.g. ten cycles of the alternating electricity) to provide an analog measurement for use by the analog PI control circuit 214 as an indication of the actual voltage level produced by the alternator. The preferred implementation employs a resistor-capacitor averaging circuit that responds quickly to voltage fluctuation due to variations in the electrical load on the alternator 104. The conventional analog PI control loop used in circuit 214 has a manually adjustable gain and has a output at which a regulated voltage command is produced.

The regulated voltage command is applied to the control input of a well known field control circuit 218, which also receives an input signal from the alternator pickup coil 154. The field control circuit 218, which may be separate from the analog voltage regulator 115, responds to those inputs by producing a field current for driving the set of stationary coils 144 of the alternator exciter 108. That field current determines the excitation level of the alternator and thus the magnitude of the rotating magnetic field produced by field coils 149. This in turn regulates the output voltage of the three electrical phases produced by the alternator 104.

As noted previously, the series connection and processing sequence of the digital voltage regulator 202 and the analog voltage regulator 115 could be reversed. In that case the field control circuit 218 could be a separate component of the hybrid voltage regulator connected after the digital voltage regulator 202 which in turn follows the analog voltage regulator 115.

The analog voltage regulator 115 utilizes a fast analog PI loop based on an average of a single phase voltage and thereby compensates for transient voltage fluctuations. As a consequence, the hybrid voltage regulator 200 comprising both digital and analog sections provides the fast acting response of an analog regulator and the long term steady-state stability and three-phase RMS voltage response of a digital voltage regulator.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A hybrid voltage regulator for controlling voltage of alternating electricity produced by an alternator, wherein the alternator has a mechanism which controls strength of a magnetic field in response to an electrical signal, the hybrid voltage regulator comprising:

a combination of a digital voltage regulator and an analog voltage regulator connected in series to convert a voltage command, that designates a desired voltage level, into a regulated voltage command; and a field control circuit that responds to the regulated voltage command by producing the electrical signal that is applied to the mechanism of the alternator;

wherein the digital voltage regulator affects conversion of the voltage command in response to an RMS measurement of the voltage of the alternating electricity, and wherein the analog voltage regulator affects conversion of the voltage command in response to an average measurement of the voltage over a plurality of cycles of the alternating electricity.

2. The hybrid voltage regulator as recited in claim 1 wherein the digital voltage regulator further affects conversion of the voltage command in response to a relationship between the voltage and frequency of the alternating electricity.

3. The hybrid voltage regulator as recited in claim 1 wherein the digital voltage regulator comprises a converter that transforms an affected version of the voltage command into an analog signal that is applied to the analog voltage regulator.

4. The hybrid voltage regulator as recited in claim 1 wherein the digital voltage regulator comprises a proportional-integral control loop that is employed to convert the voltage command.

5. The hybrid voltage regulator as recited in claim 1 wherein the analog voltage regulator comprises a proportional-integral control loop that is employed to convert the voltage command.

6. A hybrid voltage regulator for controlling voltage of alternating electricity produced by an alternator, wherein the alternator has a mechanism that controls strength of a magnetic field in the alternator and thereby a magnitude of the voltage, the hybrid voltage regulator comprising:
   a digital voltage regulator that receives a voltage command designating a desired voltage level, a first detector that produces an RMS measurement of the voltage of the alternating electricity, and a first circuit that modifies the voltage command in response to the RMS measurement thereby producing an adjusted voltage command; and
   an analog voltage regulator comprising a voltage sensor that produces an analog measurement of a voltage of the alternating electricity, a second circuit that modifies the adjusted voltage command in response to the analog measurement thereby producing a regulated voltage command, and a field control circuit that responds to the regulated voltage command by producing an electric current that is applied to the exciter.

7. The hybrid voltage regulator as recited in claim 6 wherein the analog measurement is produced by rectifying the voltage to produce a rectified voltage that then is averaged over an period of time.

8. The hybrid voltage regulator as recited in claim 6 wherein the digital voltage regulator further comprises a converter that produces an analog signal which corresponds to the adjusted voltage command, wherein the analog signal is applied to the analog voltage regulator.

9. The hybrid voltage regulator as recited in claim 8 wherein the converter comprises one of a pulse width modulator and a digital to analog converter.

10. The hybrid voltage regulator as recited in claim 6 wherein the digital voltage regulator further comprises a second detector that responds to a relationship between the voltage and frequency of the alternating electricity by producing an error value that is applied to the first circuit.

11. The hybrid voltage regulator as recited in claim 6 wherein the digital voltage regulator further comprises a second detector that receives the RMS measurement and derives a voltage to frequency ratio from which an error value is produced, wherein the first circuit also produces the adjusted voltage command in response to the error value.

12. The hybrid voltage regulator as recited in claim 6 wherein at least one of the first circuit and the second comprises a proportional-integral control loop.

13. The hybrid voltage regulator as recited in claim 6 wherein the alternator generates three phases of alternating electricity, and the first detector produces an RMS measurement of the voltage for each phase.

14. The hybrid voltage regulator as recited in claim 13 wherein the analog measurement is produced by rectifying the voltage in one phase to produce a rectified voltage that then is averaged over an period of time.

15. The hybrid voltage regulator as recited in claim 6 wherein the alternator generates three phases of alternating electricity, and the first detector produces a separate RMS voltage measurement of the voltage for each phase and then produces an average of those RMS voltage measurements.

16. A hybrid voltage regulator for controlling voltage of three phases of alternating electricity produced by an alternator, wherein the alternator has a mechanism which controls strength of a magnetic field and thereby a magnitude of the voltage, the hybrid voltage regulator comprising:
   a digital voltage regulator that receives a voltage command designating a desired voltage level, a first detector that produces an RMS value that corresponds to an average of RMS voltage measurements for each phase of the alternating electricity, and a first circuit that modifies the voltage command in response to the RMS value thereby producing a digital adjusted voltage command, and a converter that produces an analog adjusted voltage command from the digital adjusted voltage command; and
   an analog voltage regulator that receives the analog adjusted voltage command and comprising a voltage sensor that produces an average measurement by rectifying the voltage in one phase which rectified voltage then is averaged over an period of time, a second circuit that modifies the analog adjusted voltage command in response to the average measurement thereby producing a regulated voltage command, and a field control circuit that responds to the regulated voltage command by producing an electric current for applying to the mechanism of the alternator.

17. The hybrid voltage regulator as recited in claim 16 wherein the converter comprises one of a pulse width modulator and a digital to analog converter.

18. The hybrid voltage regulator as recited in claim 16 wherein the digital voltage regulator further comprises a second detector that responds to a relationship between the voltage and frequency of the alternating electricity by producing an error value which is applied to the first circuit.

19. The hybrid voltage regulator as recited in claim 16 wherein the digital voltage regulator further comprises a second detector that receives an RMS measurement of voltage produced by the alternator, and derives a voltage to frequency ratio from which an error value is produced, wherein the first circuit also produces the adjusted voltage command in response to the error value.

20. The hybrid voltage regulator as recited in claim 16 wherein at least one of the first circuit and the second comprises a proportional-integral control loop.

* * * * *